(12) United States Patent
Wilson

(10) Patent No.: US 7,022,186 B1
(45) Date of Patent: Apr. 4, 2006

(54) SYSTEM, METHOD AND APPARATUS FOR COLLECTION OF OVERSPRAY

(76) Inventor: Wayne Lee Wilson, 4821 86th St., #25, Urbandale, IA (US) 50322

( * ) Notice: Subject to any disclaimer, the term of this patent is extended or adjusted under 35 U.S.C. 154(b) by 0 days.

(21) Appl. No.: 10/619,400

(22) Filed: Jul. 15, 2003

Related U.S. Application Data

(60) Provisional application No. 60/395,709, filed on Jul. 15, 2002.

(51) Int. Cl.
*B05B 15/12* (2006.01)

(52) U.S. Cl. ................... 118/326; 118/DIG. 7

(58) Field of Classification Search ........... 118/326, 118/DIG. 7; 55/DIG. 46; 454/50, 53; 134/108, 134/200, 184; 427/345

See application file for complete search history.

(56) References Cited

U.S. PATENT DOCUMENTS

| | | | | |
|---|---|---|---|---|
| 4,096,066 A | * | 6/1978 | Kearney | 210/195.1 |
| 4,608,064 A | * | 8/1986 | Napadow | 96/307 |
| 6,497,751 B1 | * | 12/2002 | Yamauchi et al. | 95/189 |

* cited by examiner

*Primary Examiner*—Chris Fiorilla
*Assistant Examiner*—Yewebdar Tadesse
(74) *Attorney, Agent, or Firm*—McKee, Voorhees & SEase, P.L.C.

(57) ABSTRACT

A system, method and apparatus for collecting overspray from single color coating applications. Within a spraying area are one or more curtains. The curtains are continuously coated on one side with the material to be sprayed through material dispensers aimed at the upper region of the panel curtains. The material dispensers coat the panel curtains so that material runs down the panel curtains and into a recycling pan. Spraying equipment is used to coat the object. The spraying occurs in the direction of the panel curtains. Thus, any overspray material from the spraying process is deposited on the panel curtains. The flowing material on the curtain collects the overspray material to and transfers it to the collection pan for re-use in the collection process. In the collection pan, one or more agitators may be used to ensure proper consistency is maintained for the material.

6 Claims, 3 Drawing Sheets

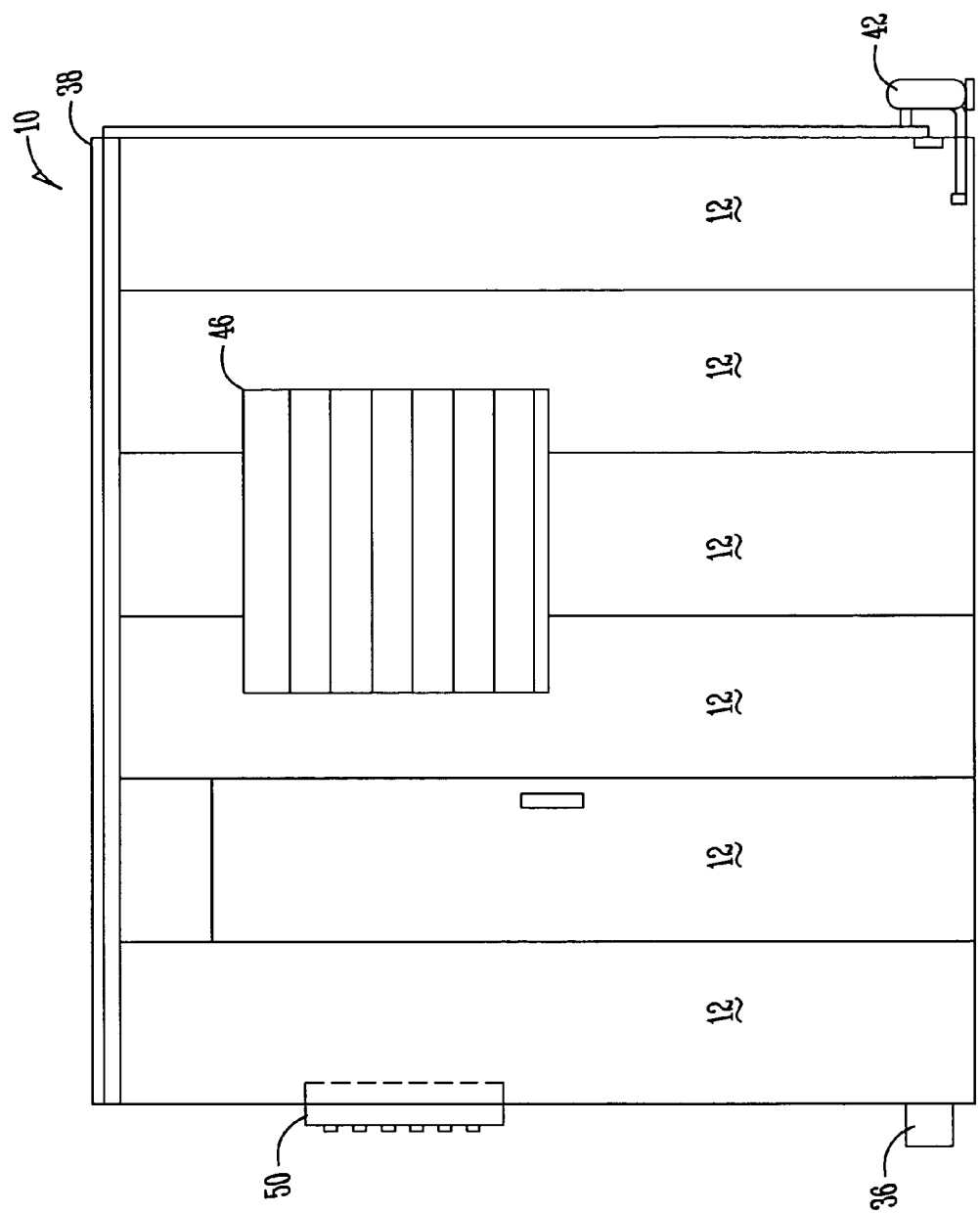

SYSTEM, METHOD AND APPARATUS FOR COLLECTION OF OVERSPRAY

CROSS-REFERENCE TO RELATED APPLICATION

This application claims the benefit of U.S. Provisional Application Ser. No. 60/395,709 filed Jul. 15, 2002.

BACKGROUND OF THE INVENTION

1. Field of the Invention

The present invention relates generally to a system, method and apparatus for collecting overspray from the application of water-bourne liquid materials such as paints, stains, varnishes, etc. More specifically, the present invention relates to a system, method and apparatus for collecting overspray that uses panel curtains coated with wet material to collect most overspray material.

2. Problems in the Art

Currently, most water based coating materials such as paints and other finishing products are sprayed onto the desired objects in a painting or spraying booth. When sprayed, these materials are projected at the object as minute air-borne particles. Some of these particles miss the intended target object and, if not filtered out, can contaminate the surrounding air and coat undesirable areas. Therefore these overspray particles of material must be contained. Current methods of containment focus on either filtering the air leaving the spraying booth, commonly known as dry filter booths, or using a water curtain to trap and sink overspray material, commonly known as water wash booths.

The dry filter booths require expensive filters that must frequently be replaced. Moreover, the excess material that is deposited on the filters is unrecoverable. The filters must be disposed of according to local code or regulatory requirements, increasing the expense of disposal. Frequently, additional payment and licensing expenses must be made just for the ability to dispose of the filters. The entire process wastes both money and material. It is therefore desirable to be able to remove air-borne particles without the need for expensive replaceable filters.

The water curtain booths collect overspray materials in a collection area, commonly referred to as a collection pan. Within the collection area, the overspray materials are trapped in the water of the collection pan and form a sludge. The trapped sludge is then treated to sink to the bottom of the collection pan. The sludge must be removed, typically by hand, and placed in large drums for disposal. Proper disposal is expensive and must be done to comply with all rules and regulations. The sludge is wasted. It is therefore desirable to be able to remove air-borne particles without the need to create a sludge that must be treated, removed and disposed of at significant expense.

3. Features of the Invention

A general feature of the present invention is the provision of a system, method and apparatus for collecting overspray that overcomes the problems found in the prior art.

Another feature of the present invention is the provision of a system, method and apparatus for collecting overspray that recycles much of the overspray material for use in collecting the overspray material.

Another feature of the present invention is the provision of a system, method and apparatus for collecting overspray that does not require the use of replaceable filters.

Yet another feature of the present invention is the provision of a system, method and apparatus for collecting overspray that reduces overall costs of a spraying operation.

These, as well as other features and advantages of the present invention will become apparent from the following specification and claims.

SUMMARY OF THE INVENTION

The present invention provides a system, method and apparatus for collecting overspray from a single color application process. In general, the system includes a spraying area that is enclosed. Within the spraying area are one or more panel curtains. The panel curtains are continuously coated on one side with the material to be sprayed. Continuous coating occurs through material dispensers aimed at the top or upper region of the panel curtains. The material dispensers flow down coatings so that material runs down the curtains and into a constant recycling pan.

An object to be sprayed is placed in the enclosed area. Spraying equipment is used by the operator to coat the object with the desired material. The spraying occurs in the direction of the curtains, such that the object to be sprayed is in-between the spraying equipment and the panel curtain. Thus, any overspray material from the spraying process is deposited on the curtain. The flowing material on the panel curtains collects the overspray material and transfers it to the collection pan for re-use in the coating process. In the collection pan, one or more agitators may be used to ensure proper consistency is maintained for the material.

BRIEF DESCRIPTION OF THE DRAWINGS

FIG. 3 is a rear cross-sectional view of the enclosed spraying area taken along line 3—3 of FIG. 1.

DETAILED DESCRIPTION OF THE PREFERRED EMBODIMENT(S)

Figure 1:
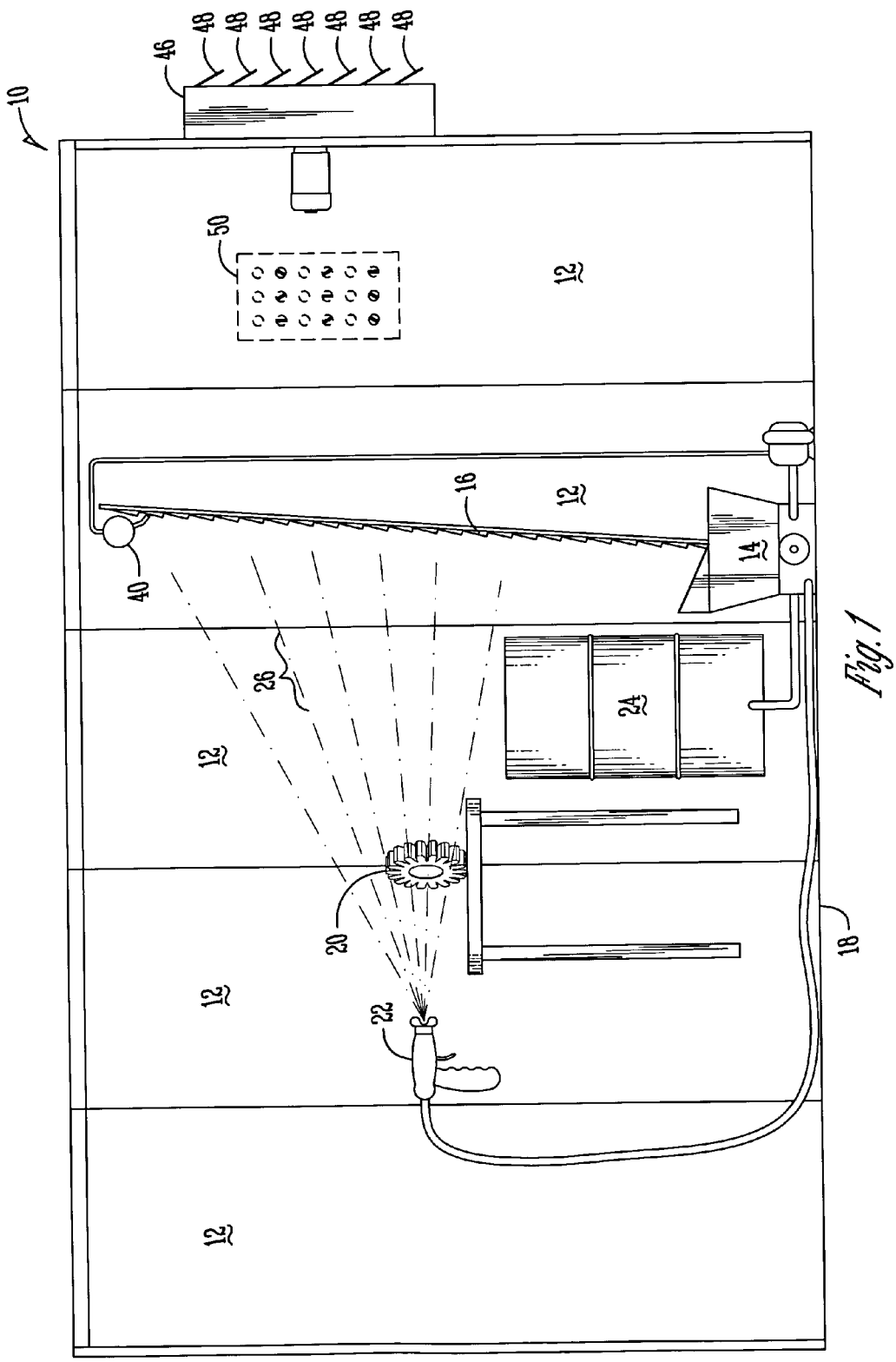
FIG. 1 is a side cross-sectional view of the enclosed spraying area.

The present invention will be described as it applies to its preferred embodiment. It is not intended that the present invention be limited to the described embodiment. It is intended that the invention cover all modifications and alternatives which may be included within the spirit and scope of the invention. As is shown in FIG. 1, the enclosed spraying area 10 is preferably made from a plurality of structural panels 12. Within the enclosed spraying area 10 is a recycling pan or bulk paint collection reservoir 14 and panel curtains 16.

The panel curtains 16 are also preferably angled slightly to prevent excess material from dripping onto the surrounding floor 18. The curtain 16 and panels 12 may be made from galvanized sheet metal or any other building material suitable for water-borne spraying applications known in the art.

An object 20 to be sprayed is placed within the booth 10. An operator or automatic application equipment uses spray equipment 22 to spray the object 20 with the desired water based coating material. The booth 10 of the present invention is intended to be used with only one color of paint or one type of water-borne material application. Using a water-borne paint as an example, the paint 26 is fed to the spraying equipment 22 from a paint supply reservoir 24.

Figure 2:
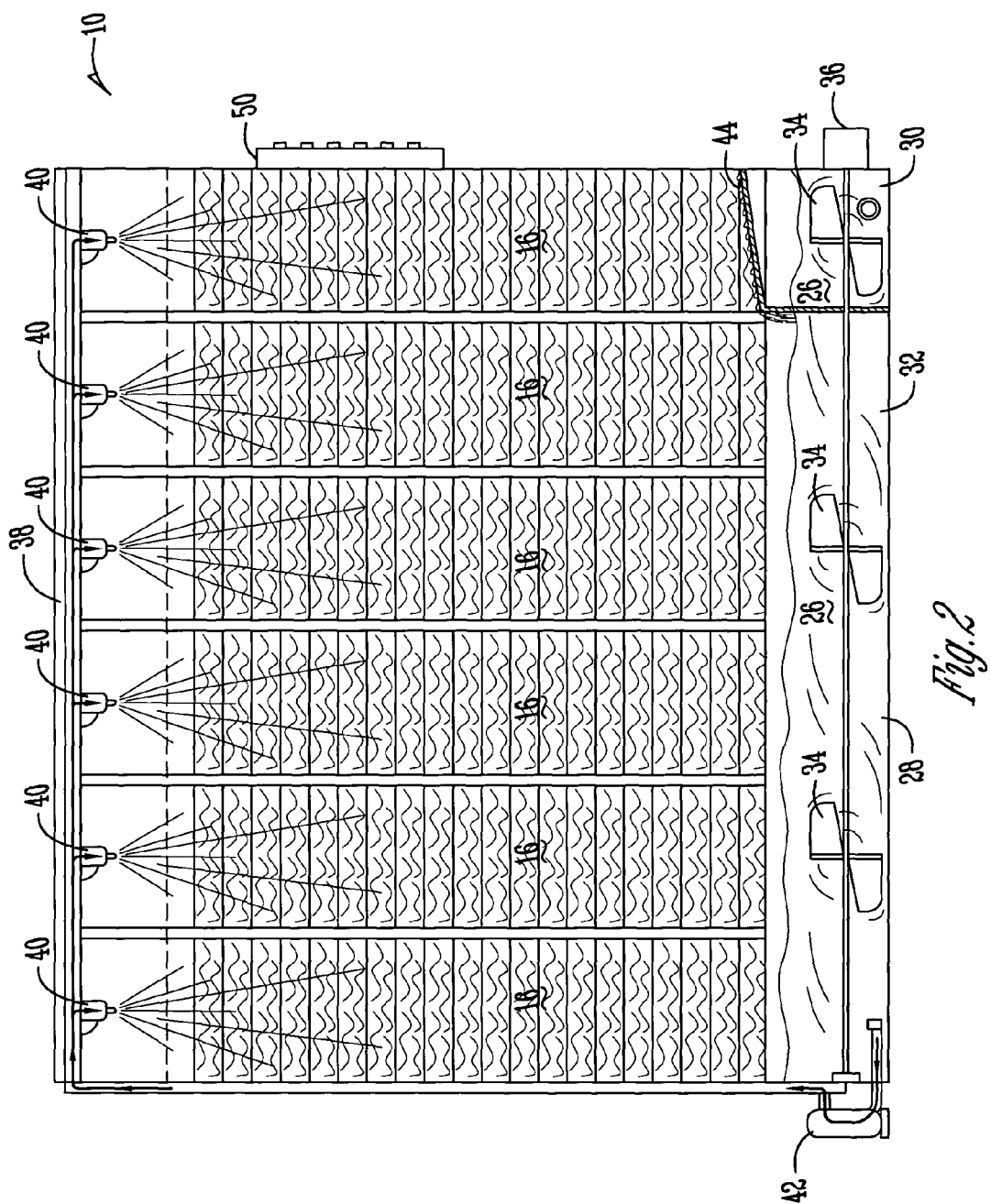
FIG. 2 is a front cross-sectional view of the enclosed spraying area taken along line 2—2 of FIG. 1.

As is shown in FIG. 2, the paint is initially agitated in a collection pan 28. The collection pan 28 is made from a strong material capable of supporting the weight and volume of liquid material typically used. Usually, the collection pan 28 is made from sheet metal that is of a heavier gage than the materials used for the panels 12. The collection pan 28 is separated into two distinct chambers 30 and 32. Paint in the originating paint chamber 30 is pumped to the spray equipment 22 for use. Agitators 34 are operated to maintain the paint 26 in suspension and also fold-in any panel cleaning water that may be added. The agitators 34 can be operated intermittently or slowly around the clock through a motor 36 or hand crank.

Paint 26 from the collection pan 28's chamber 32 is routed to a paint or cleaning manifold 38 by a pump 42 through one or more hoses. From the paint manifold 38, the paint can be flowed on the panel curtains 16 and down the panel curtains 16 and into the chamber 30 of collection pan 28. The paint 26 is dispensed from a plurality of paint nozzles or material dispensers 40. A routing shield 44 prevents paint from the curtains 16 from flowing into the originating paint chamber 30. The downwardly flowing paint 26 collects any overspray paint and incorporates it for use in collecting any additional overspray paint. In this manner, the overspray paint is not wasted, but is instead used as a means for collecting additional overspray. This eliminates the need for expensive disposable filters and prevents the creation of sludge material.

Periodically, the curtains 16 should be flushed with water to clean panel curtains and prevent the viscosity of the paint 26 from exceeding desired operational conditions. Viscosity can be measured using and electronic or manual viscosity controller as is commonly known in the art. The curtains 16 should be flushed at least once a day. The water flow can be selected by turning a valve (not shown) to allow water to flow into the paint or cleaning manifold 38 from water hoses connected thereto.

As is shown in FIG. 3, air from the working area of the booth 10 is routed out of the back or from any location behind the curtains 16 through an exhaust fan 46. Inexpensive paper baffles 48 may be added to capture any left over overspray materials. The filter 48 may be cardboard strips. A control panel 50 can be added to allow easy access to all of the controls for the pumps and fans.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A system for collecting overspray materials, the system comprising:
    an enclosed spraying area;
    an applicator spraying a material towards an object;
    panel curtains forming near a vertical wall within the spraying area, the panel curtains being located opposite the object from the applicator and including thin slots for air passage;
    material dispensers that flow the material onto an upper portion of the curtain; and
    a collection pan located beneath the panel curtains.

2. The system for collecting overspray materials of claim 1 further comprising a pump and connection hose to cycle material from the collection pan to the material dispensers.

3. The system for collecting overspray materials of claim 1 further comprising a cleaning manifold that projects water onto upper portions of the panel curtain.

4. The system for collecting overspray materials of claim 1 further comprising an agitator in the collection pan.

5. The system for collecting overspray materials of claim 1 further comprising air intake filters operatively connected to the enclosed spraying area, if desired.

6. An enclosed spraying booth, the booth comprising:
    a plurality of structural panels forming an enclosed area;
    panel curtains within the enclosed area;
    dispensers aimed at an upper region of the panel curtains; and
    a collection tray at the bottom of the panel curtains; and
    a pump and connection hose to cycle material from the collection tray to the dispensers and an applicator.

* * * * *